(12) United States Patent
Pettiau et al.

(10) Patent No.: US 9,579,601 B2
(45) Date of Patent: Feb. 28, 2017

(54) METHOD AND DEVICE FOR TREATING GAS BY INJECTING A POWDERED COMPOUND AND AN AQUEOUS PHASE

(71) Applicant: S. A. Lhoist Recherche et Developpement, Ottignies-Louvain-la-Neuve (BE)

(72) Inventors: Xavier Pettiau, Couillet (BE); Olivier Nyssen, Ghlin (BE); Alain Brasseur, Grace-Hollogne (BE); Alain Laudet, Namur (BE)

(73) Assignee: S. A. Lhoist Recherche et Developpement, Ottignies-Louvain-la (BE)

(*) Notice: Subject to any disclaimer, the term of this patent is extended or adjusted under 35 U.S.C. 154(b) by 0 days.

(21) Appl. No.: 14/898,293

(22) PCT Filed: Jun. 20, 2014

(86) PCT No.: PCT/EP2014/063017
§ 371 (c)(1),
(2) Date: Dec. 14, 2015

(87) PCT Pub. No.: WO2014/206880
PCT Pub. Date: Dec. 31, 2014

(65) Prior Publication Data
US 2016/0129394 A1    May 12, 2016

(30) Foreign Application Priority Data

Jun. 25, 2013  (BE) .................................. 2013/0435

(51) Int. Cl.
*B01D 53/83*  (2006.01)
*B01D 53/50*  (2006.01)
(Continued)

(52) U.S. Cl.
CPC ............. *B01D 53/83* (2013.01); *B01D 53/40* (2013.01); *B01D 53/504* (2013.01); *B01D 53/80* (2013.01);
(Continued)

(58) Field of Classification Search
None
See application file for complete search history.

(56) References Cited

U.S. PATENT DOCUMENTS 4,456,181 A * 6/1984 Burnham ................ B05B 1/262
239/403
4,670,238 A * 6/1987 Yoon ..................... B01D 53/501
423/242.3
(Continued)

FOREIGN PATENT DOCUMENTS

CN      201168568     * 12/2008
CN      201168568 Y    12/2008
(Continued)

OTHER PUBLICATIONS

J. Metschke, "Rauchgasreinigung Nach Dem CDAS-Verfahren," VGB Kraftwerstechnik, VGB, Kraflwerstechnik GMBH, Oct. 2000, 5 pages.
(Continued)

*Primary Examiner* — Melvin C Mayes
*Assistant Examiner* — Sheng H Davis
(74) *Attorney, Agent, or Firm* — Whitaker Chalk Swindle & Schwartz PLLC; Charles Gunter

(57) ABSTRACT

A method for treating a gas is shown which includes the steps of: injecting a powdered compound into the gas line, injecting an aqueous phase in droplet form into the line, capturing pollutants from the gases, and recovering the powdered compound separately. The step for injecting an aqueous phase in droplet form is done so as to moisten those particles of powdered compound in the gas line, when they are injected.

22 Claims, 5 Drawing Sheets

(51) Int. Cl.
  *B01D 53/80* (2006.01)
  *F23J 7/00* (2006.01)
  *F23J 15/00* (2006.01)
  *B01D 53/40* (2006.01)
  *B01D 53/10* (2006.01)

(52) U.S. Cl.
  CPC ............. *F23J 7/00* (2013.01); *F23J 15/003* (2013.01); *B01D 53/10* (2013.01); *B01D 2251/304* (2013.01); *B01D 2251/404* (2013.01); *B01D 2251/602* (2013.01); *B01D 2251/606* (2013.01); *B01D 2253/102* (2013.01); *B01D 2253/11* (2013.01); *B01D 2257/2045* (2013.01); *B01D 2257/2047* (2013.01); *B01D 2257/302* (2013.01); *B01D 2257/602* (2013.01); *B01D 2258/0283* (2013.01); *B01D 2259/126* (2013.01); *F23J 2219/50* (2013.01)

(56) References Cited

U.S. PATENT DOCUMENTS

| | | | | |
|---|---|---|---|---|
| 5,223,239 A * | 6/1993 | Moran | ................ | B01D 53/502 423/244.07 |
| 5,603,453 A * | 2/1997 | Weaver | ................ | B05B 7/0075 239/419.3 |
| 5,795,548 A * | 8/1998 | Madden | ................ | B01D 53/505 110/216 |
| 5,965,095 A * | 10/1999 | Owens | ................ | B01D 53/64 423/210 |
| 6,451,281 B1 * | 9/2002 | Ebeling | ................ | C01F 11/02 423/640 |
| 6,818,043 B1 * | 11/2004 | Chang | ................ | B01D 53/10 423/213.2 |
| 2010/0147146 A1 * | 6/2010 | Petty | ................ | B01D 53/12 95/16 |
| 2012/0251423 A1 * | 10/2012 | Allebach | ................ | B01D 53/40 423/240 S |

FOREIGN PATENT DOCUMENTS

| CN | 202646788 | * | 1/2013 |
|---|---|---|---|
| FR | 2580949 | A1 | 10/1986 |
| JP | 10216572 | * | 8/1998 |
| JP | 10216572 | A | 8/1998 |

OTHER PUBLICATIONS

International Search Report, WO 2014/206880, Oct. 2, 2014, 3 pages.
International Report on Patentability, PCT/EP2014/063017, Oct. 28, 2015, 33 pages.

* cited by examiner

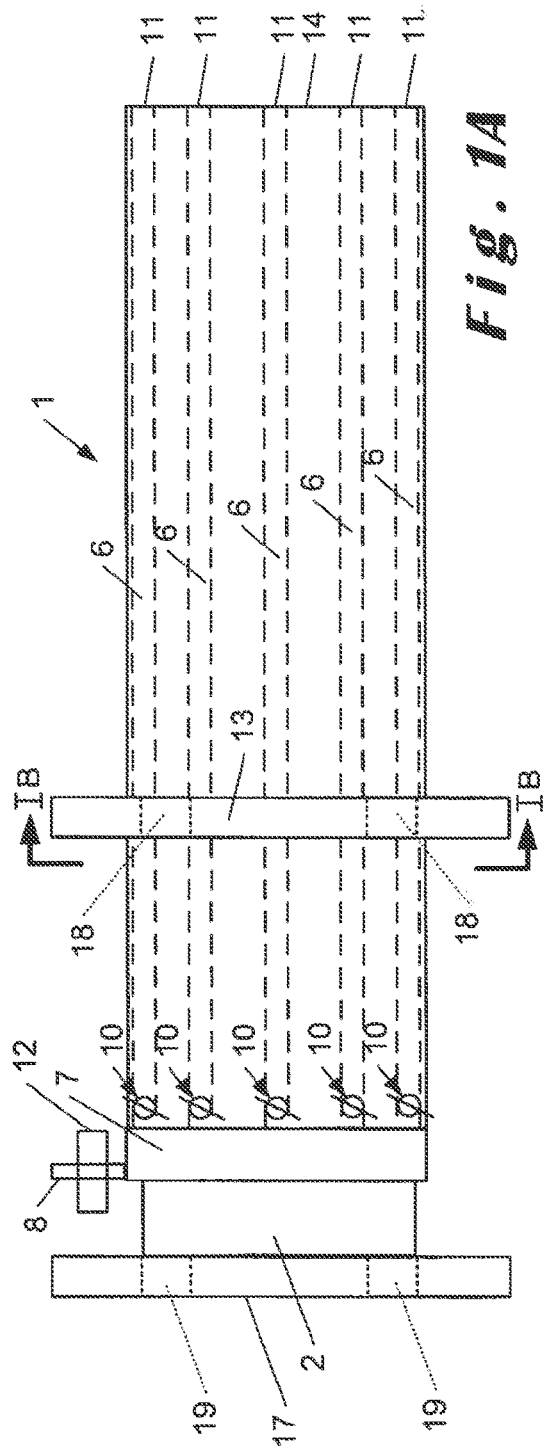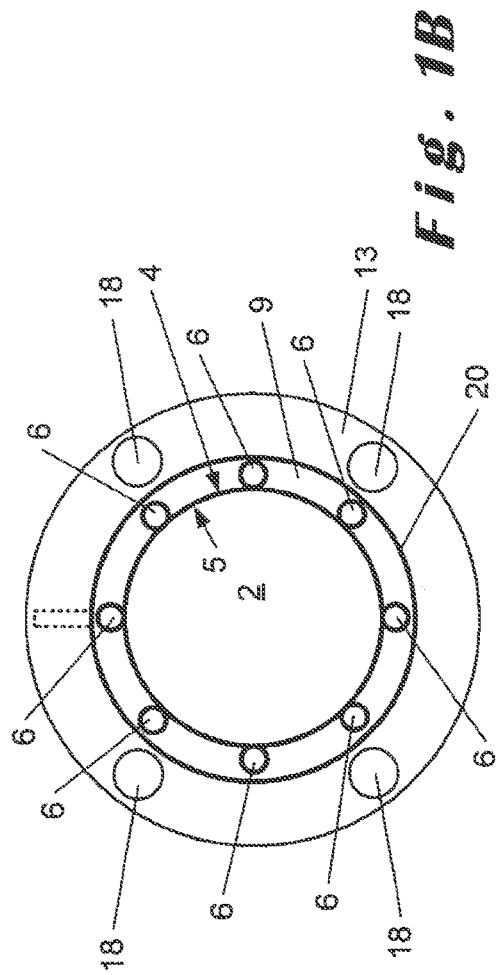

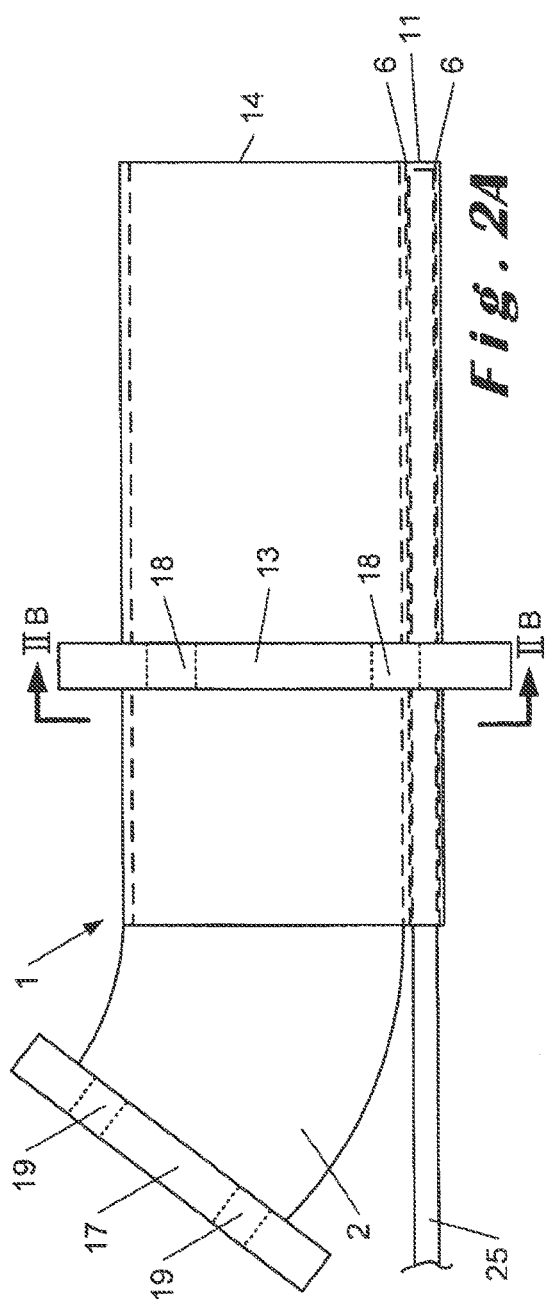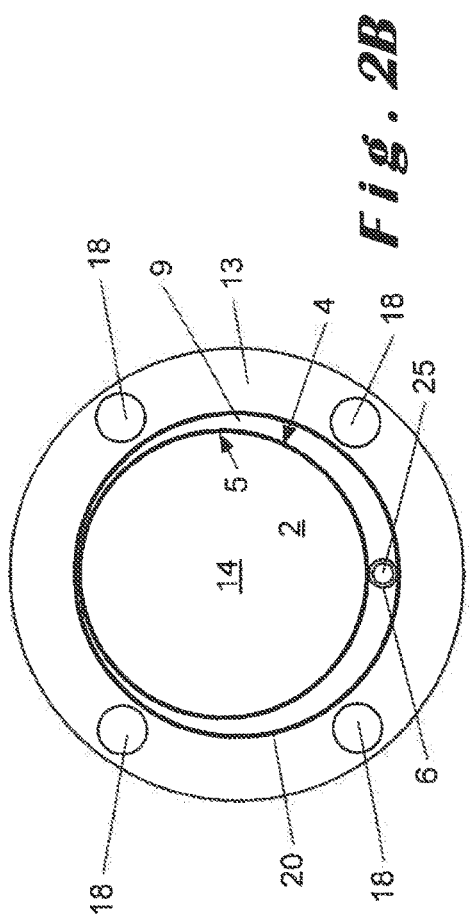

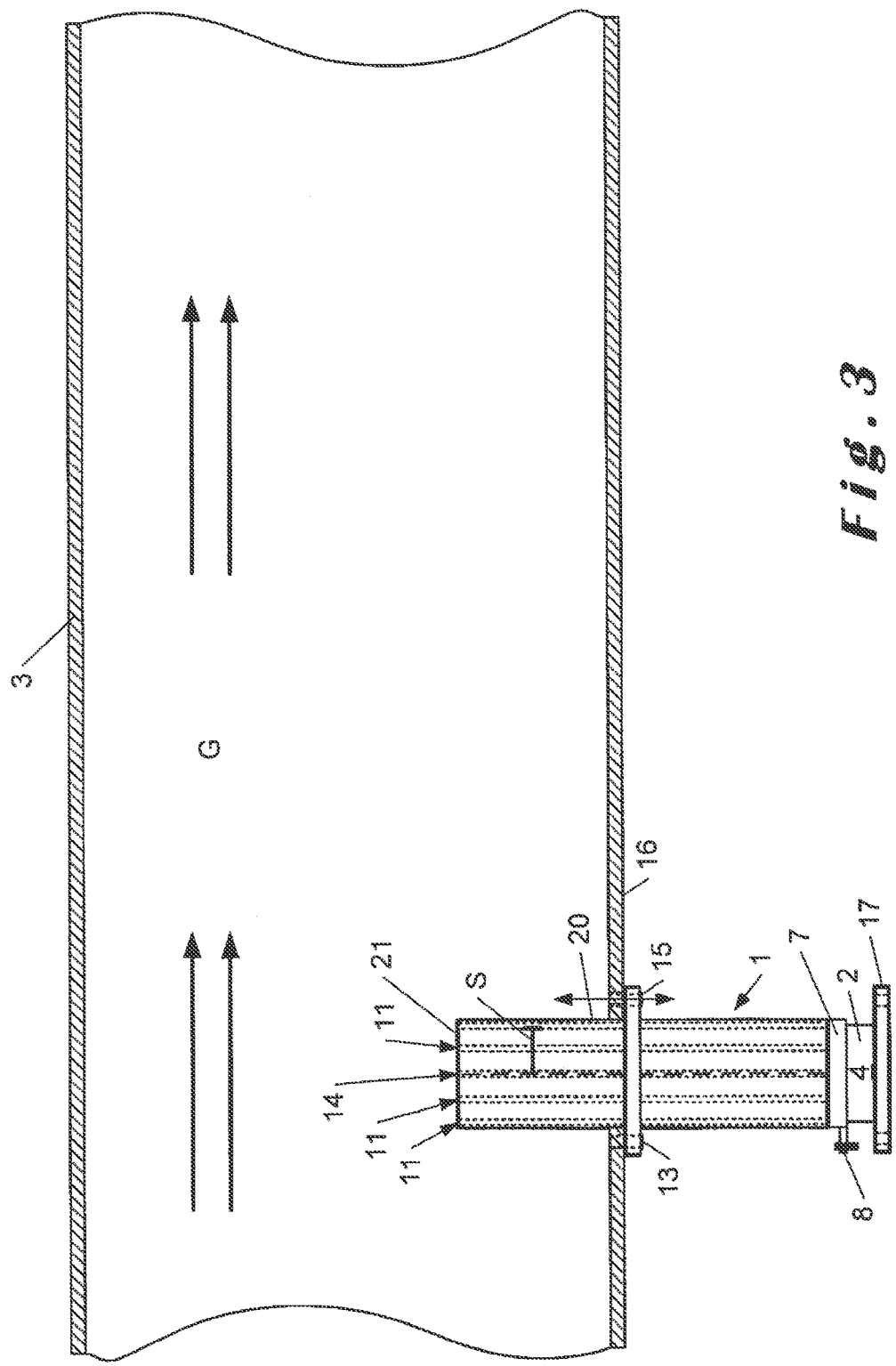

METHOD AND DEVICE FOR TREATING GAS BY INJECTING A POWDERED COMPOUND AND AN AQUEOUS PHASE

BACKGROUND OF THE INVENTION

1. Field of the Invention

The present invention relates to a method for treating gases having a predetermined flow direction in a gas conduit comprising the steps
 a) injecting a powdery compound into the flue gas conduit at an injection point of a powdery compound, via a powdery compound injection piping, said injection piping having an external face and an internal face arranged so as to be in contact with said powdery compound, so as to allow formation of a cloud or flow of particles of powdery compound in said gas conduit,
 b) injecting a monophasic liquid aqueous phase, as droplets, into said gas conduit,
 c) capturing pollutants of the gases with said powdery compound, and
 d) separately recovering said powdery compound enriched in pollutants and the gases depleted in pollutants.

2. Description of the Prior Art

Typically, the treatment of gases, in particular flue gases, requires reduction of acid gases, notably HCl, $SO_2$ and/or HF, which reduction may be carried out under dry conditions, by injecting a substance, often mineral, dry and powdery into a flue gas flow or through a filter-bed comprising solid particles either fixed or in motion. In this case, the powdery compound generally comprises a calcium-magnesium compound, in particular lime, preferably slaked or hydrated lime or a sodium compound like a sodium carbonate or bicarbonate. Other mineral compounds may also be used notably those used for reducing dioxins, furans and/or heavy metals including mercury, like for example, those based on phyllosilicates, such as seplolite or halloysite or the like.

The present invention is more particularly directed to methods for reducing acid gases in gases, in particular flue gases, by injecting a powdery product having capabilities of capturing acid pollutants in the gas flow in order to improve the reducing yields of the acid gas components of the treated gases.

More particularly a treatment of these flue gases with powdery hydrated lime is known, improved by the use of humidified hydrated lime instead of dry powdery hydrated lime. Indeed, the absorption of the pollutants of the gas phase by the particles of the solid phase is improved by the presence of water. Sometimes such a flue gases treatment is described as a semi-dry method. A method of using hydrated lime and water is also known wherein milk of lime is injected into the flue gases flow. Unfortunately, the injection of milk of lime assumes the implementation of specific means (dispersion turbines, circulation pump) which are energy consuming and subject to wear and to erosion and may lead to clogging problems. Documents CN 2011 68568 and JP 10-216 572 each propose an alternative intended to solve the clogging problems by making the milk of lime suspension in situ during the injection. For this purpose, a lance consisting of two concentric tubes, i.e. an internal tube and an external tube, is used. The water is injected via the internal tube while the hydrated lime is injected via the external tube. According to CN 2011 68568, the position of the internal tube may be adjusted relatively to the position of the external tube and it is therefore possible to have an internal tube for the water having a protruding or retracted output orifice or further at the same level with respect to an output orifice of hydrated lime of the external tube.

According to these documents, the design of the spraying lances imposes that the water projection tube be internal to the tube for projection of powdery hydrated lime. Therefore the result of this is that the sprayed lime encounters an obstacle within the external spraying tube which lies in the Internal tube for projecting water. In this way, the hydrated lime comes into contact with the generally metallic and cold surface of the internal tube, on which the lime tends to be clogged.

Further, according to these documents, the humidity level of the hydrated lime induces a water/lime mass ratio from 5 to 6 in order to form a suspension in situ. This suspension actually provides an ancillary detrimental effect for the treatment of flue gases in that the gas is further significantly cooled upon injection of hydrated lime. This assumes the availability of sufficiently hot flue gases in order for depollution to be effective; however this is not sought today while industrialists have an increasingly pronounced tendency of recovering at best the heat of the flue gases for economical and environmental reasons.

Moreover, when the hydrated lime comes into contact with a cold surface, as this is the case of the surface of the internal tube for projecting water of these documents, condensation occurs within the hydrated lime projection tube, which also has the result of promoting clogging of the projection tube and thus perturbing the injection of lime into the flue gases flow.

Finally, a water/lime mass ratio as high as the aforementioned one assumes availability and large consumption of water.

A device for injecting lime into flue gases is also known, wherein the powdery or hydrated lime injection piping is surrounded by an external concentric piping through which gas is injected (cf. US 2012/0251423).

SUMMARY OF THE INVENTION

The object of the present invention is to overcome the drawbacks of the state of the art by providing a method allowing treatment of gases, in particular of flue gases, with a powdery compound, preferably mineral compound, in particular hydrated lime, during which the risk of clogging is significantly reduced and the water consumption is minimized and this without substantially cooling the gases, and thus allowing it to not hinder the recovery of the calories from these gases to be treated.

In order to solve this problem, according to the invention a method is provided, as indicated initially, characterized in that said step for injecting a monophasic liquid aqueous phase, as droplets, is carried out inside said gas conduit in said cloud or flow of powdery compound particles, so as to humidify these powdery compound particles inside the gas conduit, during their injection, according to a weight ratio between the monophasic liquid aqueous phase injected as droplets and the injected powdery compound of greater than or equal to 0.05 and less than or equal to 1.2, said step for injecting a monophasic liquid aqueous phase being carried out via at least one monophasic liquid aqueous phase injection piping located in a peripheral space localized around said external face and having an external cover and in that the method further comprises isolation of said external face by at least one insulating layer positioned in said peripheral space.

According to the present invention, the humidification of the powdery compound is carried out at the point of injection of the powdery compound, in the gas conduit/flow to be treated. In this way, the particles of the mineral compound and the droplets of aqueous phase coexist highly locally, and the powdery compound is humidified in situ and in a controlled way.

In the cloud of droplets of the aqueous phase and of particles of the powdery compound injected according to the aforesaid weight ratio of the aqueous phase as droplets to the powdery compound, a layer of droplets of aqueous phase is thereby generated at the surface of the particles of powdery compound and facilitates the transfer of the pollutants to be reduced, notably acid pollutants, to the solid phase of the powdery compound. The layer of droplets of aqueous phase is obtained via controlled co-injection of powdery compound particles and of aqueous phase according to said weight ratio and the humidification in situ of the powdery compound avoids the recurrent problem of clogging of the injection lances for the powdery compound, in particular for humidified hydrated lime.

More specifically, the aqueous phase is injected into a close vicinity relatively to the point of injection of a powdery compound.

By "close vicinity", is meant, in the sense of the present invention that the distance between the injection point of the aqueous phase and the injection point of the powdery compound is less than or equal to the diameter of the injection point or injection piping of a powdery compound, in particular less than or equal to the radius.

Advantageously, the powdery compound is a mineral compound. It may comprise a calcium-magnesium compound, in particular lime, preferably slaked or hydrated. In a particular embodiment, the mineral compound is selected from those used for reducing dioxins, furans and/or heavy metals including mercury, like for example those based on sepolite or halloysite or the like. The powdery compound used may also be organic, notably carbonaceous, in particular of the active coal or lignite coke type. The powdery compound may also be a mixture of these compounds.

Preferably, the aqueous phase is liquid water or an aqueous solution of an alkaline compound selected from the group consisting of hydroxides, carbonates, bicarbonates, hydrogen carbonates, nitrates, phosphates, persulfates and monocarboxylates of an alkaline metal, notably of sodium, potassium and/or lithium, and mixtures thereof, or an aqueous solution of a compound based on ammonia or urea, such as ammonium salts, or an aqueous solution of a compound based on alkaline or earth-alkaline or ammonium halides, in particular on a chloride and/or bromide, notably of sodium, potassium, calcium or magnesium. Moreover, the aqueous phase may also contain acids, notably organic, difunctional acids (di-basic acids) or not.

In any case, the aqueous phase is essentially monophasic. In other words, the aqueous phase essentially consists of a liquid, in particular liquid water.

Advantageously, the temperature of the aqueous phase before injection into said flue gas conduit is less than 100° C., preferably less than 40° C., in particular less than 30° C., more particularly less than 20° C.

According to a particular embodiment, the step for injecting an aqueous phase is carried out in close vicinity downstream from said injection point of the powdery compound with respect to said predetermined flow direction of the gases in said gas conduit.

By the terms of "in close vicinity downstream" of the injection point of powdery compound, is meant in the sense of the present invention, that, relatively to the flow direction of the gases, the aqueous phase droplets are sprayed just after the powdery compound. The injected powdery compound therefore first encounters the gases and immediately afterwards the formed droplets of aqueous phase, which therefore allows humidification of the powdery compound and not of the gases to be treated.

In another particular embodiment, the step for injecting an aqueous phase is carried out in close vicinity upstream from said injection point of mineral compound with respect to said predetermined flow direction of the flue gases in said flue gas conduit.

Advantageously, said step for injecting a powdery compound is carried out in the gas conduit according to an injection direction which forms an angle from 90 to 150 degrees, preferably less than or equal to 145 degrees, preferentially less than or equal to 140 degrees and in particular less than or equal to 135 degrees, relatively to the predetermined flow direction of the gases.

In a particular embodiment, said aqueous phase droplets have an average droplet size comprised between 500 and 5,000 μm, preferably from 500 to 5,000 μm, depending on the injection conditions.

Preferably, said powdery compound, in particular powdery hydrated lime, has an average particle size $d_{50}$ of less than 80 μm, advantageously less than 50 μm, preferably less than 35 μm, preferably less than 25 μm and particularly less than or equal to 10 μm, in particular less than or equal to 8 μm.

It is understood that the powdery compound may be a powdery mineral compound co-injected with another powdery compound, notably a carbonaceous compound, in particular of the active coal or lignite coke type.

More particularly, according to the method of the present invention it is provided that said powdery compound, in particular hydrated lime, has before injection into said gas conduit a humidity (water mass content) comprised between 0.2 and 10%, in particular between 0.5 and 4%, preferably less than 2%, in particular less than 1.5%.

Indeed, when the free water content of the powdery compound is greater than 10%, implementation problems occur. In particular, when the powdery compound is slaked (hydrated) lime, if this free water content is greater than 2%, respectively 4%, it becomes difficult, respectively very difficult to handle it (problems of flow, incrustation . . . ).

In a particular embodiment according to the present invention, the weight ratio between said aqueous phase injected as droplets and said injected powdery compound is greater than or equal to 0.1, preferentially greater than or equal to 0.2, and less than or equal to 1, and more particularly less than or equal to 0.8. This weight ratio is relatively small as compared with the one indicated in the prior documents CN 2011 68568 and JP 10-216 572 and does not cause substantially cooling of the gases to be treated since, according to the present invention, the reduced proportion of added water allows humidification of the powdery compound, in particular of the hydrated lime, without humidifying and therefore significantly cooling the gases.

Indeed, in the prior documents CN 2011 68568 and JP 10-216 572, the high weight ratio between water and the hydrated lime comprised between 5 and 6 is dictated by the fact that a suspension of hydrated lime (milk of lime) is sprayed into the gas to be treated. In this case, the temperature of the gases is strongly reduced by the injection of a large amount of water which consumes calories upon evaporating.

In a particularly advantageous way, in the method according to the present invention said gases have, before injection of said powdery compound, a temperature comprised between 10 and 1,100° C., in particular between 10 and 100° C., notably between 15 and 80° C., in particular between 20 and 70° C. or between 100° C. and 300° C., preferably between 130° C. and 250° C. and preferentially between 150° C. and 230° C., in particular between 160° C. and 220° C. In another alternative of the method according to the invention, said gases have, before injection of said powdery compound, a temperature comprised between 300° C. and 500° C., preferably between 320° C. and 450° C., preferentially between 330° C. and 400° C. or between 850 and 1,100° C., preferably between 900 and 1,100° C. and preferentially between 950° C. and 1,050° C.

As this may be seen, the temperature of the gases is not substantially influenced by the small amount of water and the size of droplets which according to the invention essentially contribute to humidifying the powdery compound. Further, as the injection of an aqueous phase takes place in the cloud of injected powdery compound, notably in close vicinity to the point of injection of the powdery compound, the contact between the droplets of aqueous phase and the particles of powdery compound is promoted and very rapid, which allows optimization of the reduction of acid pollutants, facilitated by the water layer formed around the particles of powdery compound.

In an alternative of the method according to the present invention, said gases have, after injection of said powdery compound and of said aqueous phase as droplets, a temperature comprised between n and n −10° C., preferably between n and n −8° C., preferably between n and n −5° C., in particular between n and n −3° C., n being the temperature of the gases before injection of the powdery compound and of the aqueous phase.

In particular, in an advantageous embodiment, said injection of the aqueous phase is carried out through a spraying piping, preferably as a flat jet fan at a pressure comprised between 2 and 150 bars. In an alternative, this pressure will rather be comprised between 2 and 20 bars, preferably between 3 and 15 bars and preferentially of about 8 bars. In another alternative, the pressure will be comprised between 20 and 150 bars, in particular between 30 and 100 bars. These high pressures allow avoiding fouling of the spraying piping.

In this way, in this particular embodiment of the invention, very fine droplets are obtained and from the moment that it is not sought according to the invention to generate a cloud of vapor, a high pressure may be used since it allows good dispersion as very fine droplets and contributes to the contact efficiency between the aqueous phase droplets and the powdery compound particles by improving their humidification, but without cooling the hot gases.

Other embodiments of the method according to the invention are indicated in the appended claims.

The object of the invention is also a device for injecting a powdery compound, preferably a mineral compound, in particular powdery hydrated lime, to be introduced into a flue gas conduit comprising a source of powdery compound, a powdery compound injection piping, supplied by the source of powdery compound and laid out so as to open into said gas conduit, said powdery compound injection piping having an external face and an internal face arranged so as to be in contact with said powdery compound, said device for injecting a powdery compound further comprising a source of monophasic liquid aqueous phase and at least one piping for injecting a monophasic liquid aqueous phase as droplets supplied by this source of monophasic liquid aqueous phase.

Such a device is known from the state of the art, such as for example from documents CN 2011 68568 and JP 10-216 572. In these documents which intend to provide a device suitable for treating flue gases with milk of lime (suspension), the water injection piping is concentric to a piping of a larger diameter for injecting hydrated lime in order to produce a suspension of hydrated lime in situ.

As mentioned in document CN 2011 68568, in certain devices for treating flue gases with milk of lime, provision is made so that the position of the internal tube may be adjusted relatively to the position of the external tube. In such a case, the internal tube for water has a protruding or retracted output orifice or further at the same level with respect to a hydrated lime output orifice of the external tube.

Unfortunately, regardless of the selected configuration, the presence of the concentric internal tube to the external hydrated lime spraying tube imposes abutment of the hydrated lime particles against the water projection internal tube. The hydrated lime therefore comes into contact with the metallic and cold surface of the internal tube, on which the lime tends to clog. The solution provided to the prior clogging problems is therefore quite relative.

Further, according to these documents, the concentric configuration and the intention to form a suspension of hydrated lime in situ has the effect that a water/lime ratio of 5 to 6 is required. Unfortunately, in such a case, the device according to document CN 2011 68568 and JP 10-216 572 has the effect of cooling the flue gases, thereby posing a new problem for industrial actors having an increasing tendency of recovering the calories from flue gases in order to propose more economical and environment-friendly methods.

Finally, when the hydrated lime comes into contact with a cold surface, as this is the case of the surface of the water projection internal tube of these documents, condensation occurs within the tube for projecting hydrated lime, which also has the result of clogging the projection tube and thus perturbing the injection of lime into the flue gas flow.

The object of the present invention is to overcome the drawbacks of the state of the art by providing a device allowing injection of a powdery compound, preferably a mineral compound, in particular hydrated lime, and humidification of its particles in the treatment of the gases, for which the clogging risk is significantly reduced, and this without cooling the gases, thereby giving the possibility of not interfering with the recovery of the calories from these gases to be treated.

In order to solve this problem, according to the invention a device is provided as indicated earlier, characterized in that said at least one piping for injecting a monophasic liquid aqueous phase is located in a peripheral space localized around said external face of the powdery compound injection piping and having an external cover and in that at least one insulating layer is positioned in said peripheral space between said external face of said powdery compound injection piping and the external cover.

In this way, the powdery compound injected into the piping for injecting a powdery compound does not encounter any obstacle and much less cold or metallic surface against which it would tend to be deposited and be clogged. Further, said at least one piping for an aqueous phase located in a peripheral space localized around the external face of the piping for injecting a powdery compound is thus laid out so as to allow injection of aqueous phase droplets, in particular of liquid water, in close vicinity with respect to the point of injection of powdery compound. By close vicinity, is meant in the sense of the present invention, that the distance separating the outer diameters of the pipings for respectively injecting aqueous phase and powdery compound is less than or equal to the diameter of the piping for injecting a powdery compound, preferably less than the radius.

Moreover, the particular configuration of said at least one piping for injecting an aqueous phase and of said piping for injecting a powdery compound gives the possibility of treating the gases via a quasi-dry method, by only humidifying the powdery compound, in particular the lime, and in the latter case, without forming any milk of lime suspension. This operation is carried out without significantly humidifying the gases, and therefore without cooling the gases for which heat recovery is increasingly desired. This particular configuration does not require, unlike the state of the art disclosed in document CN 2011 68568 and JP 10-216 572, a high water/lime weight ratio and allows the value to be reduced from between 5 and 6 to a value of less than or equal to 1.2, preferably less than or equal to 1, more particularly less than or equal to 0.8. Accordingly, a cloud of particles of powdery compound in particular hydrated lime, is generated in the flow of flue gases and aqueous phase droplets, notably of water, in a relatively small amount are injected into the gas flow. These aqueous phase droplets encounter the dense cloud of powdery compound particles and improve the reduction of the pollutants, notably acid compounds of the gases, without cooling the gases.

In a preferential embodiment, the device includes a plurality of pipings for injecting an aqueous phase as droplets, each connected to a distributor connected to said source of aqueous phase, each piping of said plurality of injection pipings being located in said peripheral space, each piping further being provided with a valve.

Advantageously, in the device according to the present invention, each piping for injecting an aqueous phase is laid out in a concentric tube, outside which the piping for injecting an aqueous phase is retractable.

More particularly, according to the present invention, each piping for injecting an aqueous phase includes an output orifice as a slot or planar sprayer.

In an alternative of the present invention, the distributor is connected to a pressurized means arranged in order to impart to the aqueous phase a pressure comprised between 2 and 150 bars, notably between 2 and 20 bars, preferably between 3 and 15 bars and more preferentially of about 8 bars and in another alternative between 20 and 150 bars, in particular between 30 and 100 bars. Of course, this may be an aqueous phase supply, in particular of liquid water, directly available at the aforementioned pressures.

As indicated earlier, according to the invention it is provided that the device includes an external cover around said peripheral space.

The device according to the present invention includes, in said peripheral space, at least one insulating layer between said external face of said piping for injecting a powdery compound and said external cover.

In further another embodiment of the present invention, the device further includes a device for closing said peripheral space provided with a series of orifices among which an orifice for a powdery compound and at least one orifice for an aqueous phase, said orifice for a powdery compound being arranged so as to accommodate an outlet of said piping for injecting a powdery compound, each orifice for an aqueous phase being arranged so as to accommodate an outlet of each piping for injecting an aqueous phase.

Preferably, in the device according to the present invention, said external cover has a diameter comprised between 100 and 250 mm, preferably less than 200 mm and more preferentially between 110 and 170 mm, in particular between 125 and 150 mm.

Advantageously, said piping for injecting a powdery compound has a diameter comprised between 75 and 150 mm, preferably between 80 and 125 mm and in particular of about 100 mm.

More particularly, according to the present invention, each piping for injecting an aqueous phase has a diameter comprised between 5 and 30 mm, preferably between 6 and 20 mm and more preferentially between 8 and 16 mm.

Other embodiments of the device according to the invention are indicated in the appended claims.

Other features, details and advantages of the invention will become apparent from the description given hereafter, without any limitation and with reference to the appended drawings.

BRIEF DESCRIPTION OF THE DRAWINGS

FIG. 1A is a schematic side view of a first embodiment of the device for treating gases according to the present invention. FIG. 1B is a sectional view along the line I-I of FIG. 1A.

FIG. 2A is a schematic side view of a second embodiment of the device for treating gases according to the present invention. FIG. 2B is a sectional view along the line II-II of FIG. 2A.

FIG. 3 is a schematic side view of the embodiment according to FIG. 1 of the device for treating gases according to the present invention, for example used in a flue gas conduit, the direction of Injection of the powdery compound here being perpendicular to the flow direction of the flue gases.

FIGS. 3 to 5 illustrate methods, inter alia, for coupling devices according to the invention to a flue gas conduit.

DETAILED DESCRIPTION OF THE INVENTION

Figure 4:
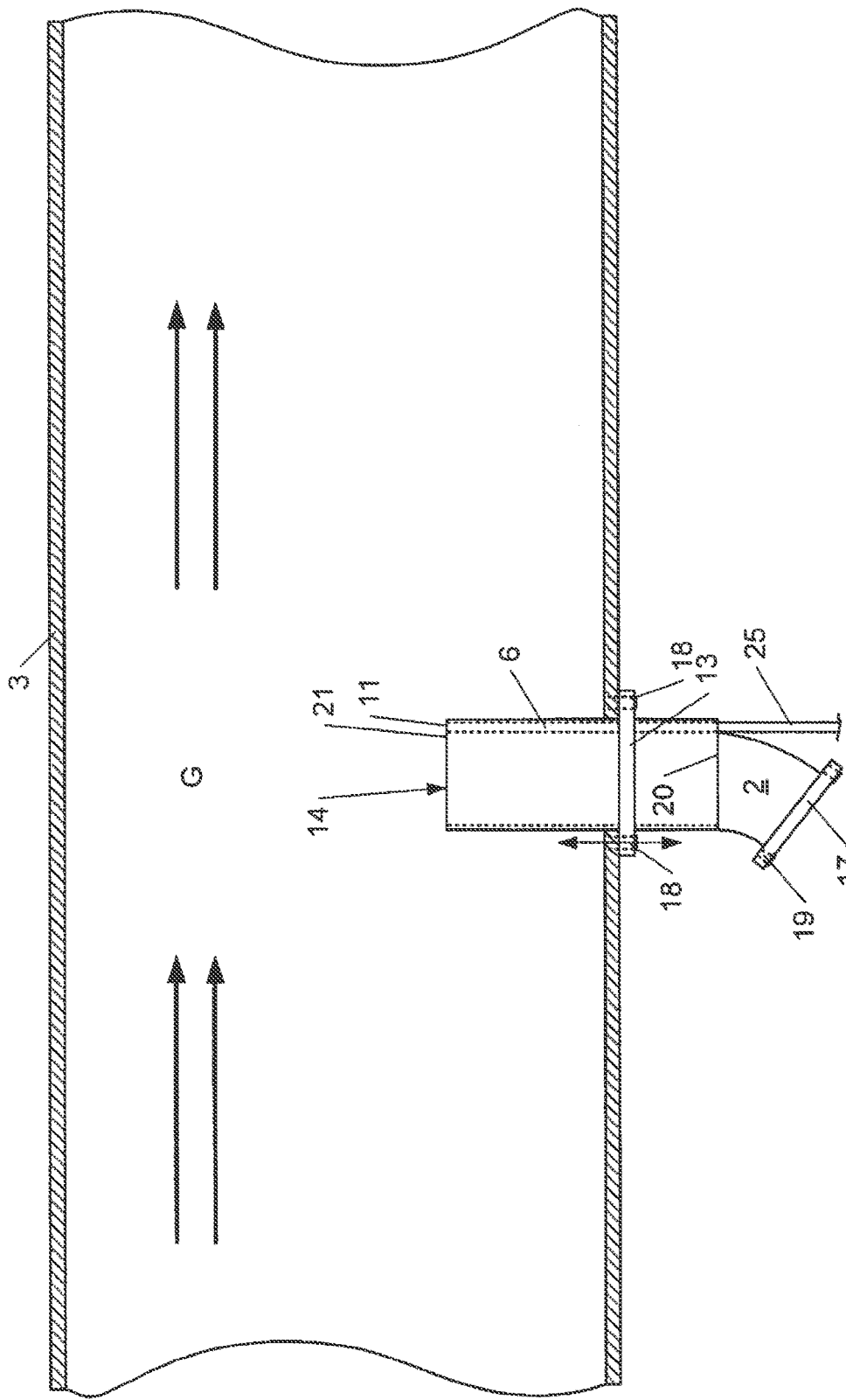
FIG. 4 is a schematic side view of the second embodiment according to FIG. 2 of the device for treating flue gases according to the present invention, used in a flue gas conduit, the direction of injection of the powdery compound here being also perpendicular to the flow direction of the flue gases.

In the Figures, identical or similar elements bear the same references. The injected powdery compound is in the illustrated cases of a mineral nature and the treated gases are flue gases.

As this may be ascertained in FIGS. 1A and 1B, the device according to the present invention is a device for injecting a powdery mineral compound 1 to be introduced into a flue gas conduit, comprising a piping for injecting the powdery mineral compound 2 connected to a source of powdery mineral compound (not shown). The piping for injecting the mineral compound is laid out so as to open into said flue gas conduit 3 (see FIG. 3) and for allowing exit of the mineral compound via an outlet orifice for the mineral compound 14.

The piping for injecting the mineral compound 2 has an external face 4 and an internal face 5. During operation, the internal face 5 is in contact with said powdery mineral compound during its use in the injection piping 2.

The powdery mineral compound injection device 1 comprises in this illustrated embodiment a plurality of pipings for injecting an aqueous phase 6 as droplets, each connected to a distributor 7 connected to a supply of aqueous phase 8. As this may be seen in FIG. 1A or 1B, each piping 6 of the plurality of injection pipings is located around the mineral compound injection piping 2 in a space outside the latter, called here a peripheral space 9. Each aqueous phase injection piping 6 further comprises a valve 10 located between the distributor 7 and the aqueous phase outlet 11 of each aqueous phase injection piping 6. The exit of an aqueous phase 11 as droplets from each aqueous phase injection piping is practically and advantageously achieved by an aqueous phase outlet orifice in the form of a slot of planar spray, by means of a nozzle (not shown).

By means of the valves 10, it is possible to not supply some of the pipings 6 and for example only supply those located immediately downstream from the injection point of the mineral compound relatively to the flow direction G of the flue gases in the flue gas conduit 3.

The distributor 7 is connected to a pressurized aqueous phase supply 8. In an alternative of the device, a pressurizing means 12 gives the possibility of imparting the intended pressure to the water entering via the water supply 8. The pressure of the aqueous phase supply 8 is typically comprised between 2 and 150 bars. In one alternative, this pressure will rather be comprised between 2 and 20 bars, preferably between 3 and 15 bars and still more preferentially of about 8 bars. In another alternative, the pressure will be comprised between 20 and 150 bars, in particular between 30 and 100 bars. These high pressures give the possibility of avoiding fouling of the spraying piping.

The mineral compound injection device further comprises a flange 13 provided with through-orifices 18 in order to be able to bolt or attach by any other means the device for treating flue gases through a flue gas conduit.

Indeed, as this may be seen in FIG. 3, the flue gas conduit 3 to be treated includes an orifice for introducing the device 1. The latter is introduced into this orifice and attached on the conduit in a common way, by the flange 13 and attachment means 15. Tightening the flange 13 gives the possibility of maintaining pressure on the external face 16 of the flue gas conduit 3, but also ensures the seal of the connection of the device according to the present invention.

In the embodiment illustrated in FIGS. 1A and 1B, a second flange 17 is present on the flue gas treatment device. This flange 17 is provided with a series of through-orifices 19 laid out for receiving attachment means. The flange 17 is laid out so as to be connected to a current mineral compound source (not illustrated).

Advantageously, an external cover 20 is present around said peripheral space 9. The external cover 20 preferably has a diameter comprised between 100 and 250 mm, preferably less than 200 mm and more preferentially between 110 and 170 mm, in particular between 125 and 150 mm.

In the peripheral space 9, an insulator layer may be provided between the external face 4 of said mineral compound injection piping and the external cover 20. The insulator may be simply air or any other insulating material known to one skilled in the art. It gives the possibility of avoiding cooling of the external face 4 which is isolated from the piping 6 which reduces the risks of agglomeration against the internal face 5 of the mineral compound circulating in the mineral compound injection piping.

The device according to the present invention further comprises preferably a cap or a device 21 for closing said peripheral space. This cap is provided with a series of orifices among which the outlet orifice for the mineral compound 14 and as many outlet orifices for the aqueous phase 11 as aqueous phase piping 6 which are present.

For injecting a mineral compound, a cylindrical tube 2 with a diameter of about 125 mm in stainless steel is typically used, which is mounted on a flange 13. The stainless steel is a source of agglomeration and clogging of the mineral compound and accordingly, the tube 2 in stainless steel (mineral compound injection piping 2) should be as short as possible and as direct as possible (without any obstacle) for reducing the dead areas. Consequently, the substantially cylindrical tube 2 (a bend may notably be used as illustrated in FIG. 2A) should take into account these considerations. Briefly, the device according to the present invention includes such a cylindrical mineral compound injection tube 2 which was modified in such a way that at least one aqueous phase injection piping 6 may be inserted along the substantially cylindrical mineral compound injection tube 2 without generating any obstacle in the flow of particles of the mineral compound in the substantially cylindrical piping/tube 2. In the embodiment illustrated in FIGS. 1A, 1B and 3, eight pipings for injecting an aqueous phase 6 as droplets, have been placed around the mineral compound injection piping 2, and the diameters of these piping 6 were selected so that the piping 6 may be integrated into the flange 13.

Typically, the powdery mineral compound injection piping 2 has a diameter comprised between 75 and 150 mm, preferably between 80 and 125 mm and in particular of about 100 mm. Generally, each water injection piping 6 has a diameter comprised between 5 and 30 mm, preferably between 6 and 20 mm and more preferentially between 8 and 16 mm.

When it is desirable to treat flue gases in a conduit with hydrated lime for lowering inter alia acid pollutants, the device according to the present invention is positioned as illustrated for example in FIG. 3. Hydrated lime is then injected into the hydrated lime injection piping 2 and leaves the piping via the outlet orifice 14. At this moment, a hydrated lime cloud, the particles of which typically have an average particle size $d_{50}$ of less than 80 μm, advantageously less than 50 μm, preferably less than 35 μm, preferably less than 25 μm and more particularly less than or equal to 10 μm, in particular less than or equal to 8 μm, is formed in the conduit of flue gases to be treated 3. Advantageously, before injection into the flue gases, the hydrated lime has a humidity comprised between 0.2 and 10% by weight, in particular between 0.5 and 4% by weight, preferably less than 2%, in particular less than 1.5%.

The pressurized aqueous phase enters the distributor 7 via said supply 8 and then penetrates into the water injection piping 6 for which the valves 10 or some of them are in an open position.

According to an enhanced embodiment of the method according to the present invention, the step for injecting the aqueous phase as droplets is carried out in said cloud or flow of mineral compound in said flue gas conduit 3, in a close vicinity downstream from said injection point of the mineral compound relatively to the flow direction of the flue gases (indicated by a dual arrow G in FIG. 3), in said flue gas conduit 3. In this way, the injected powdery mineral compound is humidified and not or very few flue gases to be treated. The injection of aqueous solution droplets in a close vicinity downstream from the injected particles of mineral compound, relatively to the flow direction of the flue gases to be treated, is carried out in this embodiment by closing the valves 10 present on the aqueous phase injection piping 6 located upstream and opening those of the pipings located downstream.

In the device, illustrated in FIG. 3, only the aqueous phase droplet injection pipings under pressure located in the portion S of the flue gas treatment device according to the present invention (downstream relatively to the gas flow) may have their valves in the open position while the other pressurized droplet injection pipings have valves in a closed position. In this way, the Injected pressurized aqueous phase droplets are introduced into a close vicinity downstream from the injection point of mineral compound particles, and the mineral compound particles are advantageously humidified.

The pollutants of the flue gases are then captured by said mineral compound and this in an improved way by the presence of the aqueous phase particles surrounding the mineral compound particles. Next, the mineral compound enriched with pollutant compound and flue gases depleted in pollutants are recovered separately in a common way, notably by filtration.

The mixed device for injection of a mineral compound/aqueous phase according to the present invention is therefore a simple, easy and inexpensive concept which gives the possibility of improving the capture of acid gases from flue gases.

The temperature of the flue gases is typically comprised between 100 and 1,100° C. In certain facilities, this temperature varies from 110° C. to 350° C., preferably between 130° C. and 250° C. and even more preferentially between 150° C. and 230° C., in particular 180° C. and 220° C. In other cases, notably the activities generating $SO_2$ as a main pollutant, the temperature of the flue gases is typically comprised between 250° C. and 500° C. or between 850° C. and 1,100° C. in a more upstream position (closer to the combustion area), preferably between 300° C. and 450° C. or between 900° C. and 1,100° C. in a more upstream position and preferentially between 330° C. and 400° C. or between 950° C. and 1,050° C. in a more upstream position. The effect of humidification of the mineral compound is of a relatively short period of time since the aqueous phase droplets evaporate very quickly in hot gases. Therefore, the contact between the mineral compound particles injected into the flue gases and the water droplets has to be obtained as rapidly as possible.

The size of the aqueous phase droplets is on average comprised between 500 and 5,000 μm, preferably between 500 and 1,000 μm or between 1,000 and 5,000 μm depending on the injection conditions, and is in particular obtained by using pipings with flat outlet orifices (as slots) through which the aqueous phase droplets are formed. The size of the obtained droplets also promotes contact between the aqueous phase droplets injected into the cloud of particles of mineral compound and the mineral compound particles as soon as they are injected into the flue gas conduit.

As mentioned earlier, it is generally difficult to inject into the flue gases a mineral composition, in particular humid hydrated lime (containing more than 2% or even 4% of water) or humidified beforehand because of the agglomeration of the particles which occurs and which has the effect of clogging the injection pipings. Further, humid hydrated lime or humidified beforehand is more easily subject to carbonatation (quite fast), which induces a reduction in the capture performances. Finally, the agglomerated particles of mineral compound, in particular humid hydrated lime have reduced capture capacities because of the reduction in the accessibility to their pores. Typically, the fine particles are sought for improving the capture performances. The use of the device according to the present invention allows humidification of the fine mineral compound particles injected into the conduit of flue gases to be treated as such, in situ and they react with notably acid gases in the cloud of aqueous phase droplets directly generated and also dry in situ since evaporation is very fast in the hot flue gases. Therefore, water evaporation occurs before the particles have had the time to agglomerate.

This is also due to the fact that according to the present invention, the amount of injected water is only the amount of water required for humidifying the mineral compound particles and for generating a cloud formed with mineral compound particles and with aqueous phase droplets. The weight ratio between said injected aqueous phase as droplets and said injected powdery mineral compound is less than or equal to 1.2, preferably less than or equal to 1 and in particular less than or equal to 0.8. The aforesaid weight ratio is also greater than or equal to 0.1 and particularly greater than or equal to 0.2. Accordingly, the aqueous phase injected as fine droplets has only little impact on the temperature of the flue gases to be treated and does not perturb the subsequent potential steps for heat recovery. According to the present invention, the flue gases have after injection of the mineral compound and of the aqueous phase as droplets, a temperature comprised between n and n−10° C., preferably between n and n−8° C., preferably between n and n−5° C., in particular between n−3° C., n being the temperature of the flue gases before injecting the mineral compound and said aqueous phase.

According to the present invention, even if typically both aqueous phase and mineral compound injection systems are attached on the same device for treating flue gases, it is obvious that they operate independently of each other. Accordingly, it is possible to only operate by injecting aqueous phase droplets or only the mineral compound, if the actual case requires this.

FIG. 2 illustrates an alternative of the device for treating flue gases according to the present invention.

As this may be seen, the device 1 according to the present invention comprises here a piping for injecting a powdery mineral compound 2 connected to a powdery mineral compound source (not shown). The piping for injecting a mineral compound is laid out so as to open into said conduit of flue gases 3 (see FIGS. 4 and 5) and for allowing outflow of the mineral compound via an outlet orifice for the mineral compound 14. The piping for injecting a mineral compound 2 has an external face 4 and an internal face 5. During operation, the internal face 5 is in contact with said powdery mineral compound which is injected into the injection piping 2.

The device for injecting a powdery mineral compound 1 also comprises a piping for injecting an aqueous phase 6 as droplets, which is connected to an aqueous phase supply 8, and which is localized in a concentric tube located in the peripheral space 9. The piping for injecting an aqueous phase, although this is not illustrated here, may further comprise a stop valve 10. The outlet orifice for an aqueous phase 11 as droplets from the aqueous phase of injection piping is in practice achieved as a slot or a planar sprayer.

The pressure of the aqueous phase supply 8 is typically comprised between 2 and 150 bars. In an alternative, this pressure will rather be comprised between 2 and 20 bars, preferably between 3 and 15 bars and still more preferentially of about 8 bars. In another alternative, the pressure will be comprised between 10 and 150 bars, in particular between 20 and 100 bars. These high pressures give the possibility of avoiding fouling of the spraying piping.

The mineral compound injection device further comprises a flange 13 provided with through-orifices 18 in order to bolt or attach through any other means the device for treating flue gases to a flue gas conduit via a flange 23.

Figure 5:
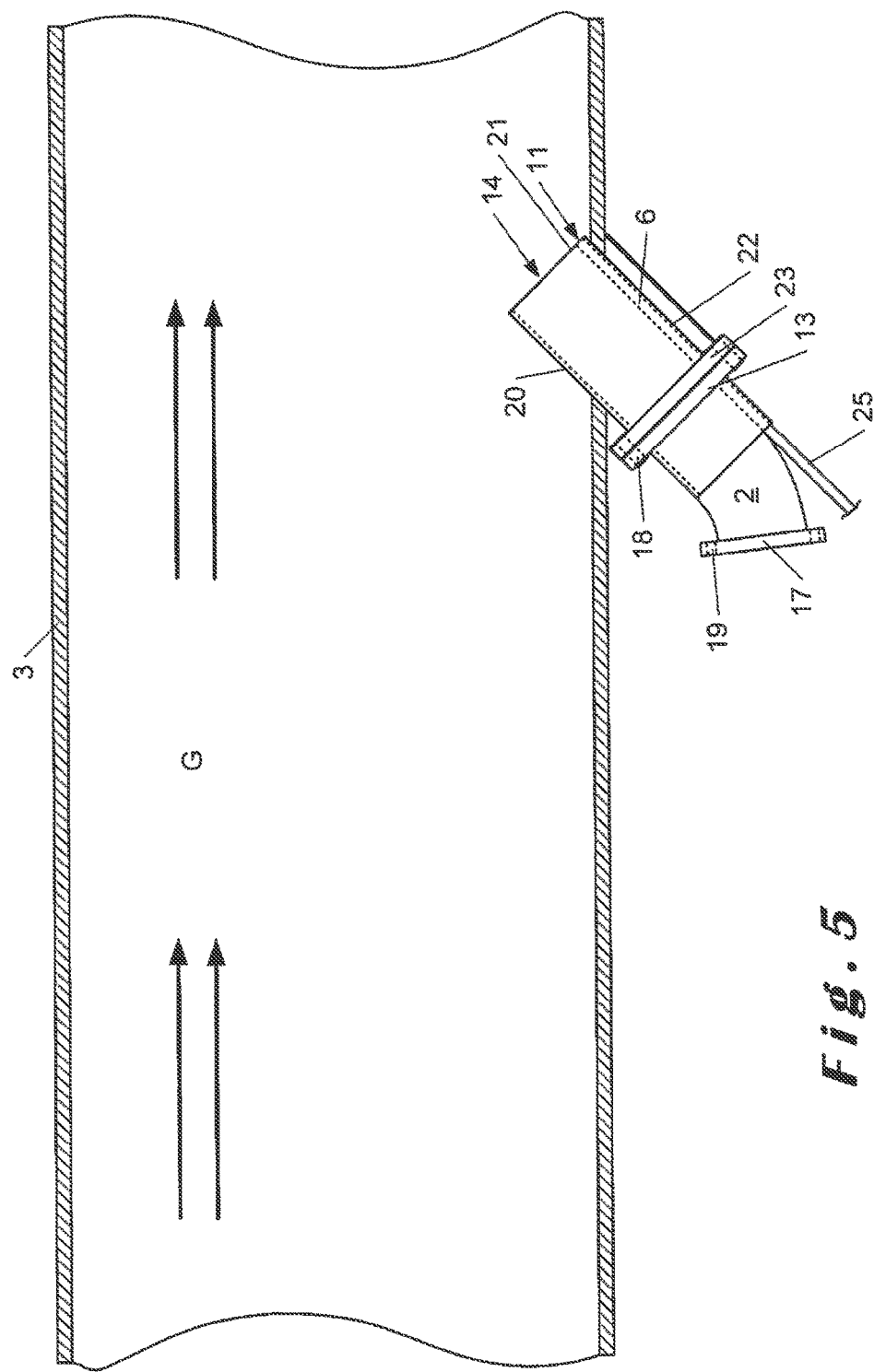
FIG. 5 is a schematic side view of the embodiment according to FIG. 2 of the device for treating flue gases according to the present invention, used in a flue gas conduit. Here, the direction of injection of the powdery compound is located obliquely with respect to the flow direction of the flue gases.

Indeed, as this may be seen in FIG. 5, the conduit of flue gases 3 to be treated may include an introduction conduit 22 for the device 1 according to the present invention. The introduction conduit 22 is provided with a flange 23 at its end. The device according to the present invention 1 is introduced into this conduit and attached thereon by means of the flanges 13 and 23.

As this may be seen in these FIGS. 4 and 5, the step for injecting a powdery mineral compound is carried out in the conduit of flue gases 3 according to an angle from 90 to 150 degrees, preferably less than or equal to 145 degrees, preferentially less than or equal to 140 degrees and in particular less than or equal to 135 degrees, relatively to the flow direction G of the flue gases.

This orientation of the piping for the mineral compound relatively to the flow direction of the flue gases is by no means related to the embodiment of the device according to the invention. This means that the embodiment comprising a plurality of aqueous phase injection pipings illustrated in FIGS. 1 and 3 may also be oriented in a tilted way relatively to the wall of the conduit of flue gases.

Further, the device according to the present invention, in the version illustrated in FIGS. 1A, 1B, 2A and 2B, may be more or less inserted into the conduit of flue gases, depending on the desiderata and may typically penetrate into the gas conduit by a length comprised between 0 and 40 cm.

The technical considerations such as the length of the piping, the operating parameters of the device according to the present invention, in this embodiment, vary to the same extent as what was described for FIGS. 1A, 1B and 3.

In the embodiment illustrated in FIGS. 2A and 2B, a second flange 17 is present on the device for treating flue gases. This flange 17 is provided with a series of through-orifices 19 laid out for receiving an attachment means. The flange 17 is laid out so as to be connected to a source of mineral compound (not shown).

Advantageously, an external cover 20 is present around said peripheral space 9. The external cover 20 preferably has a diameter comprised between 100 and 250 mm, preferably less than 200 mm and more preferentially between 110 and 170 mm, in particular between 125 and 150 mm.

In the peripheral space 9, provision may be made for an insulator layer between said external face 4 of said powdery mineral compound injection piping and the external cover 20. The insulator may simply be air or any insulator known to one skilled in the art and gives the possibility of avoiding cooling of the external face 4, thus isolated from the aqueous solution piping 6 which reduces the risks of agglomeration of the particles of the mineral compound, in particular of the hydrated lime, circulating in the injection piping 2.

The device according to the present invention further preferably comprises a cap or a device 21 for closing said peripheral space provided with a series of orifices among which an outlet orifice for the mineral compound 14 and an outlet orifice of the tube concentric with the aqueous phase injection piping 11.

As this may also be seen in this embodiment illustrated in FIGS. 2A, 2B, 4 and 5, the aqueous phase injection piping 6 is laid out in a concentric tube, from which the aqueous phase injection piping 25 is retractable, which gives the possibility of cleaning or changing the aqueous phase injection piping without stopping the injection of mineral compound. In order to facilitate the extraction from the aqueous phase injection piping, the present invention provides a slight curvature in the mineral compound injection piping, which remains as small as possible for avoiding obstacles inside the essentially cylindrical tube for bringing the mineral compound 2 and thereby reducing the agglomeration of mineral compound on the walls.

For the embodiment illustrated in FIGS. 2A, 2B, 4 and 5, the main tubing for injecting a mineral compound typically has a diameter of 100 mm and the tube concentric with the aqueous phase injection piping has a diameter of 25 mm. Both tubes are confined in a cover 20 having a diameter of about 125 mm.

EXAMPLES

Example 1

$SO_2$ reducing tests were conducted by using the pilot facility described in WO 2007/000433 (FIG. 2, p 10, I.20 to p 12, I.14). In a tubular reactor, calcium hydroxide (hydrated lime) particles are passed as a co-current with a gas containing 1,500 mg/Nm$^3$ of $SO_2$, 9% by Vol. of $CO_2$ and 10% by Vol. of $H_2O$, and having a total flow rate of 1.132 Nm$^3$/h and a temperature of 220° C.

Two types of hydrated limes were used. The first sample (Sample 1) was hydrated lime obtained according to the teaching of patent application WO 97/14650. The second sample (Sample 2) was hydrated lime obtained according to the teaching of patent application WO 2007/000433.

The table shows the $SO_2$ reducing levels obtained by varying the humidity of the tested reagents from 0.7% by weight based on the weight of hydrated lime to 4.1% by weight for a stoichiometric factor of 2.5 and an absorbent flow rate of Q.

The Q absorbent flow rate corresponds to the hydrated lime flow rate required for neutralizing the $SO_2$ flow rate, if the yield of the reaction was 100% (stoichiometric equilibrium), multiplied by a "stoichiometric" factor, taking into account that a portion of the injected absorbent does not actually participate in the reaction. In the present case, Q has the value of 5.05 g/h.

TABLE

| Sample | Humidity at 150° C. in % by mass | Reduction of $SO_2$ to a stoichiometric factor of 2.5 (%) |
| --- | --- | --- |
| Sample 1 | 0.7% | 18 |
|  | 2.0% | 27 |
|  | 2.6% | 28 |
|  | 3.0% | 29 |
|  | 3.7% | 29 |
|  | 4.0% | 29 |
| Sample 2 | 0.9% | 27 |
|  | 1.9% | 36 |
|  | 2.6% | 38 |
|  | 2.7% | 39 |
|  | 3.8% | 36 |
|  | 4.1% | 35 |

Example 2

Industrial Test

The parameters of the flue gases are the following:
- Total flow rate: 20,000 $Nm^3/h$
- Temperature: 180° C.
- Water content: 4-5% by volume
- $O_2$ content: 15-18% by volume Hydrated lime prepared according to the teaching of patent application WO 2007/000433 was injected upstream from a sleeve filter for reducing $SO_2$. For an $SO_2$ content of 1,800 $mg/Nm^3$ upstream from the sleeve filter and of 700 $mg/Nm^3$ at the outlet, a reduction by 15 to 20% of the lime consumption was observed when the lime was humidified as compared with the situation when the lime was not humidified (17 $dm^3/h$ of water or a water/time mass ratio of 0.25). Indeed, a transformation rate of the lime of 35% is observed when the lime is not humidified and of 40% when it is humidified. The device of FIG. 1 according to the present invention was used; it had a tilt of about 120° relatively to the direction of flow of the gases.

Example 3

Industrial Test

The parameters of the flue gases are the following:
- Total flow rate: 250,000 $Nm^3/h$
- Temperature: 150° C.
- Water content 10% by volume
- $O_2$ content: 16% by volume A hydrated lime prepared according to the teaching of patent application WO 2007/000433 was injected upstream from a sleeve filter in order to study the effects of its humidification level on the $SO_2$ reducing levels.

Thus, for an $SO_2$ content of 224 $mg/Nm^3$ upstream from the sleeve filter and for a same lime consumption (flow rate of 50 kg/h), an $SO_2$ content at the outlet of the filter is obtained of respectively 134 $mg/Nm^3$ (which is equivalent to a transformation rate of the lime of 53%) when the lime is not humidified and of 112 $mg/Nm^3$ (transformation rate of the lime of 67%) when the lime is humidified in an amount of 30 $dm^3/h$ of water (water/lime mass ratio of 0.6). Therefore it is observed that humidified lime allows a gain in $SO_2$ reduction of 25% as compared with the same non-humidified lime.

Example 4

Industrial Test

A standard hydrated lime was injected into the same facility and with the same parameters of the flue gases as in Example 3 in order to study the effects of its humidification level on the $SO_2$ reduction levels.

Thus, for an $SO_2$ level of 420 $mg/Nm^3$ upstream from the sleeve filter and for a same lime consumption (flow rate of 120 kg/h), an $SO_2$ content is obtained at the outlet of the filter of respectively 336 $mg/Nm^3$ (which is equivalent to a transformation rate of the lime of 20%) when the lime is not humidified, of 266 $mg/Nm^3$ (transformation rate of the lime of 37%) when the lime is humidified in an amount of 30 $dm^3/h$ of water (water/lime mass ratio of 0.25) and of 241 $mg/Nm^3$ (transformation rate of the lime of 43%) when the lime is humidified in an amount of 120 $dm^3/h$ of water (water/lime mass ratio of 1). It is therefore observed that humidified lime in an amount of 30 and 120 $dm^3/h$ of water allows a $SO_2$ reduction gain of respectively 85% and 110% as compared with the same non-humidified lime.

It is quite understood that the present invention is by no means limited to the embodiments described above and that many modifications may be brought thereto without departing from the scope of the appended claims. For example, it is possible to combine the presence of the distributor 7 with a single water injection piping 6 or with any other desired number in the device for treating flue gases according to the present invention. It is also possible that the assemblies of FIGS. 3 and 4 include, like in FIG. 5, an introduction conduit 22 provided with a flange 23 at its end.

The invention claimed is:

1. A method for treating gas having a predetermined flow direction in a gas conduit comprising the steps of
    a) injecting a powdery compound into the gas conduit at an injection point of a powdery compound, via a powdery compound injection piping, said injection piping having an internal face being in contact with said powdery compound and an external face, and so forming a cloud or flow of particles of powdery compound in said gas conduit at said injection point,
    b) injecting a monophasic liquid aqueous phase as droplets into said gas conduit,
    c) capturing pollutants of the gases with said powdery compound, and
    d) separately recovering said powdery compound enriched in pollutants and the gases depleted in pollutants,
    wherein said step for injecting a monophasic liquid aqueous phase as droplets is carried out inside said gas conduit in the injected cloud or flow of powdery compound particles, so as to humidify these powdery compound particles inside the gas conduit, during their injection, according to a weight ratio between the monophasic liquid aqueous phase injected as droplets and the injected powdery compound of greater than or equal to 0.05 and less than or equal to 1.2, said step for injecting a monophasic liquid aqueous phase being carried out via at least one monophasic liquid aqueous phase injection piping located within a peripheral space localized around said external face and having an external cover, the method further comprising isolation of said external face by at least one insulating layer positioned in said peripheral space between said external face and said external cover.

2. The method according to claim 1, wherein said powdery compound injection step is carried out in the gas conduit following an injection direction forming an angle from 90 to 150 degrees, relatively to the flow direction of the gases.

3. The method according to claim 1, wherein said powdery compound has an average particle size $d_{50}$ of less than 80 µm.

4. The method according to claim 1, wherein said powdery compound, before injection into said gas conduit, has a humidity (water mass content) comprised between 0.2 and 10%.

5. The method according to claim 1, wherein the weight ratio between the aqueous phase injected as droplets and the injected powdery compound is greater than or equal to 0.1, and less than or equal to 1.

6. The method according to claim 1, wherein said gases before injection of said powdery compound, have a temperature comprised between 10° C. and 100° C.

7. The method according to claim 1, wherein said gases before injection of said powdery compound, have a temperature comprised between 100° C. and 300° C.

8. The method according to claim 1, wherein said gases, before injection of said powdery compound, have a temperature comprised between 300° C. and 500° C.

9. The method according to claim 1, wherein said gases before injection of said powdery compound, have a temperature comprised between 850° C. and 1,100° C.

10. The method according to claim 1, wherein said gases, after injection of said powdery compound and of the aqueous phase as droplets, have a temperature comprised between n and n−10° C., n being the temperature of the gases before injection of the powdery compound and of the aqueous phase.

11. The method according to claim 1, wherein said injection of the aqueous phase is carried out at a pressure comprised between 2 and 150 bars.

12. The method according to claim 1, characterized in that the powdery compound is a mineral compound selected from the group consisting of hydrated lime, sodium carbonate or bicarbonate, halloysite and sepiolite, a carbonaceous organic compound selected from active coal and lignite coke, or a mixture of these compounds.

13. The method according to claim 1, characterized in that the aqueous phase consists of water or of an aqueous solution of an alkaline or ammonia-based compound or based on halides, or on acids.

14. A device for injection of a powdery compound, to be introduced into a flue gas conduit comprising a source of powdery compound, a powdery compound injection piping supplied by the source of powdery compound and laid out in order to open into said gas conduit, said powdery compound injection piping having an internal face being in contact with said powdery compound and an external face, said powdery compound injection device further comprising a source of monophasic liquid aqueous phase and at least one piping for injecting an aqueous phase as droplets supplied by this monophasic liquid aqueous phase source, said at least one monophasic liquid aqueous phase injection piping being located within a peripheral space localized around said external face of the powdery compound injection piping and having an external cover, at least one insulating layer being positioned in said peripheral space between said external face of said powdery compound injection piping and the external cover.

15. The device according to claim 14, comprising a plurality of pipings for injecting an aqueous phase as droplets, each connected to a distributor connected to said aqueous phase source, each piping of said plurality of aqueous phase injection pipings being located in said peripheral space and further being provided with a stop valve.

16. The device according to claim 14, wherein each aqueous phase injection piping is laid out in a concentric tube out of which the aqueous phase injection piping is retractable.

17. The device according to claim 14, wherein each aqueous phase injection piping includes an outlet orifice formed as a slot.

18. The device according to claim 15, wherein the distributor is connected to a pressurization means for imparting to the aqueous phase a pressure comprised between 2 and 150 bars.

19. The device according to claim 14, further comprising a device for dosing said peripheral space provided with a series of orifices, among which a mineral compound orifice and at least one aqueous phase orifice, said mineral compound orifice being laid out for housing an outlet of said powdery compound injection piping, each aqueous phase orifice being laid out for housing an outlet of each aqueous phase injection piping.

20. The device according to claim 14, wherein said external cover has a diameter comprised between 100 and 250 mm.

21. The device according to claim 14, wherein said powdery compound injection piping has a diameter comprised between 75 and 150 mm.

22. The device according to claim 14, wherein each aqueous phase injection piping has a diameter comprised between 5 and 30 mm.

* * * * *